United States Patent

Neuhaus et al.

(10) Patent No.: US 6,481,276 B2
(45) Date of Patent: Nov. 19, 2002

(54) DEVICE FOR MEASURING THE FILLING LEVEL OF A FILLING MATERIAL IN A CONTAINER

(75) Inventors: Joachim Neuhaus, Steinen (DE); Michael Krause, Steinen (DE); Udo Grittke, Lörrach (DE); Gerd Wartmann, Greenwood (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/739,973

(22) Filed: Dec. 20, 2000

(65) Prior Publication Data

US 2002/0017131 A1 Feb. 14, 2002

(30) Foreign Application Priority Data

Aug. 2, 2000 (DE) .......................................... 100 37 715

(51) Int. Cl.$^7$ .......................... G07F 23/00; G07F 23/36; G08B 21/00
(52) U.S. Cl. ........................ 73/304 C; 73/313; 340/618
(58) Field of Search ........................... 73/304 C, 290 R, 73/313; 340/618

(56) References Cited

U.S. PATENT DOCUMENTS

| | | | | |
|---|---|---|---|---|
| 4,169,543 A | * | 10/1979 | Hall ........................ | 73/304 C |
| 4,513,616 A | * | 4/1985 | Bezard et al. ................ | 73/295 |
| 4,601,201 A | * | 7/1986 | Oota et al. ................ | 73/304 C |
| 4,739,658 A | * | 4/1988 | Slavik ........................ | 73/313 |
| 4,799,174 A | * | 1/1989 | Kramer et al. .............. | 364/550 |
| 5,756,876 A | | 5/1998 | Wetzel et al. | |
| 6,006,604 A | | 12/1999 | Rabelo et al. | |

FOREIGN PATENT DOCUMENTS

| | | |
|---|---|---|
| DE | 361 72 234 A1 | 11/1987 |
| DE | 3904824 A1 | 8/1990 |
| DE | 4405238 C2 | 8/1995 |
| DE | 195 10 484 A1 | 10/1996 |
| DE | 195 36 199 C2 | 4/1997 |
| DE | 195 36 199 | 11/1997 |

OTHER PUBLICATIONS

Oglesby W. : "Automatic Tank Gauging Systems Compared to Process Level Instrumentation", Bd. 49, No. Part 2, 1994, Seiten 463–470.

* cited by examiner

Primary Examiner—Daniel S. Larkin
Assistant Examiner—K Wilson
(74) Attorney, Agent, or Firm—Jones, Tullar & Cooper, P.C.

(57) ABSTRACT

The present invention relates to a device for measuring the filling level of a filing material in a container, having a sensor and a control/evaluation unit. The invention provides a device which permits optimized determination of the filling level and/or the monitoring of the filling level in a container. For this purpose a sensor is designed such that it is operated in conjunction with at least two different measurement methods and/or the sensor is operated in at least two different operating modes, that the control/evaluation unit operates the sensor respectively according to at least one of the two measurement methods and/or at least in one of the two operating modes, and that the control/evaluation unit determines the filling level of the filling material in the container with the aid of the measured data of the sensor, which are supplied via at least one measurement method and/or during at least one operating mode.

10 Claims, 1 Drawing Sheet

DEVICE FOR MEASURING THE FILLING LEVEL OF A FILLING MATERIAL IN A CONTAINER

FIELD OF THE INVENTION

The present invention relates to a device for measuring the filling level of a filling material in a container.

BACKGROUND OF THE INVENTION

In order to determine the filling level of a filling material in a container, use is made of measuring systems which measure different physical variables. The desired information on the filling level is subsequently derived with the aid of these variables. In addition to mechanical scanners, use is made of capacitive, conductive or hydrostatic measuring probes, and of detectors which operate on the basis of ultrasound, microwaves or radioactive radiation.

In the case of capacitive measurements for determining the filling level of a filing material in a container, the capacitive probe and container wall form the electrodes of a capacitor. If the container wall is not conductive, a separate second electrode must be provided inside or outside the container. Depending on the filling level of the medium in the container, either air or a medium is located between the two electrodes, and this is reflected in a change in the measuring capacity because of the different dielectric constants of the two substances. Furthermore, the measuring capacity is, of course, also a function of the respective filling level of the medium in the container, since the two variables of "filling level" and "measuring capacity" depend upon one another functionally. Capacitive probes can therefore be used both in the detection of limit levels and in a continuous determination of filling levels. A capacitive filling level probe has been disclosed, for example, in German Patent No. 195 36 199 C2.

In run-time methods with guided electromagnetic radio-frequency pulses (TDR method or pulsedradar method) or with continuous, frequency-modulated microwaves (for example FMCW radar method), the measuring signals are coupled onto a conductive element or a waveguide and introduced by means of the waveguide into the container in which the filling material is stored. Consideration is given as waveguides to the known variants of Sommerfeld or Goubau surface waveguides or Lecher waveguides.

From a physical point of view, in this measurement method the effect is utilized that because of the sudden change (discontinuity) in the dielectric constants of the two media at the interface between two different media, for example air and oil or air and water, some of the guided radio-frequency pulses or of the guided microwaves are reflected and led back into a receiving device via the conductive element. The reflected component (→useful echo signal) is larger in this case the greater the difference in the dielectric constants of the two media. The distance to the surface of the filling material can be determined with the aid of the run time of the reflected component of the radio-frequency pulses or the CW signals (echo signals).

Certain advantages, but also disadvantages, by comparison with the respective other method are to be seen in a direct comparison between a capacitive measuring system and a measuring system having guided electromagnetic measuring signals. Specifically, measurements of a capacitive sensor are virtually insensitive to a moving surface of the filling material. Furthermore, the measurements are not influenced appreciably either by foaming filling materials nor by the formation of a deposit on the capacitive sensor. However, in order to be able to carry out the filling level measurement with high accuracy it is necessary to calibrate the capacitive measuring system for at least two levels, and this can be very time-consuming, depending on the size of the container and the filling material, or is ruled out in the extreme case of the use of a capacitive sensor. A further disadvantage of capacitive measuring systems is to be seen in that the measurement is a function of the respective dielectric constants in the case of a nonconductive filling material.

The fact that filling level measurements are not possible in the region of the so-called block distance since the useful echo signals disappear here into interference signals is critical in the case of a measuring system with guided high-frequency measuring signals. The interference signals are caused, for example, by reflections of the measuring signals in the region of the coupling of the measuring signals onto the conductive element, or they occur as a consequence of the interaction of the measuring signals with a stub in which the measuring system is fastened (upper block distance). A further interference signal limiting the possible measuring range occurs at the free end of the conductive element (lower block distance).

By contrast, in the case of measuring systems having guided radio-frequency measuring signals it is very advantageous that they deliver highly accurate measurement results, and that there is usually no need for calibration, in particular no two-point calibration as in the case of capacitive measuring systems. Furthermore, measurement by means of guided measuring signals is largely independent of the respective dielectric constant of the filling material; moreover, a measuring system having guided radio-frequency measuring signals still functions acceptably even for relatively small dielectric constants.

SUMMARY OF THE INVENTION

It is the object of the present invention to provide a device which permits optimized determination of the filling. level and/or monitoring of the filling level in a container.

The object is achieved by virtue of the fact that the device comprises a sensor and a control/evaluation unit, the sensor being designed such that it is operated in conjunction with at least two different measurement methods and/or the sensor is operated in at least two different operating modes, the control/evaluation unit operating the sensor respectively according to one of the two measurement methods and/or in one of the two operating modes, and the control/evaluation unit determining the filling level of the filling material in the container with the aid of the measured data of the sensor, which are supplied via at least one measurement method and/or during at least one operating mode. The solution according to the invention provides that the measured values are obtained via the capacitive measurement method or via the method having guided radio-frequency measuring signals either alternatingly, arbitrarily offset in time or simultaneously, that is to say in a quasi-parallel fashion. It is therefore possible, for example, to achieve optimized adaptation of the measuring system to the properties of the filling material respectively to be measured; moreover, it is possible respectively to make use for the purpose of obtaining measured values of that measuring system which delivers the best measurement results under the given conditions. If the measured values from the capacitive measuring system and the measuring system having guided measuring signals occur closely together in time, it is possible, however, even to carry out a plausibility check.

The device according to the invention is distinguished, in particular, by virtue of the fact that highly accurate filling level measurements are possible over the entire height of the container, the measured values respectively used being virtually uninfluenced by the nature and the type of the filling material respectively to be measured. The highly accurate measurements over the entire height of the container are rendered possible by virtue of the fact that one method is, or can be, always replaced by the respective other method whenever the disadvantages of the respective other measuring system come to bear. It is, moreover, possible to correct the measured values which one system delivers with the aid of the measured values which the other measuring system delivers. Furthermore, the possibility is provided of, for example, undertaking to calibrate the capacitive measuring system via the measured values which are delivered by the measuring system having guided measuring signals.

In accordance with a preferred development of the device according to the invention, the sensor is at least one conductive element which extends into the container. The conductive element can be, for example, at least one rod or at least one cable.

An advantageous refinement of the device according to the invention provides that the at least one conductive element is optionally used to carry out a capacitive measurement method or a run-time method, the at least one conductive element forming an electrode in the case of the capacitive measurement method, and radio-frequency measuring signals being guided along the at least one conductive element in the case of the runtime method.

In accordance with an advantageous development of the device according to the invention, an input/output unit is proposed via which the respectively desired operating mode of the sensor is input. The operating staff can therefore adapt the measuring system used in an optimum fashion to the nature of the filling material to be measured or to be monitored.

Alternatively, a switching unit is provided via which the sensor can be switched from one operating mode into the other. In particular, the switching unit is an electronic switch, preferably a MOSFET transistor. As already mentioned, the switch can be used alternately to activate one measuring system or the other, such that the measured values of one measuring system or the other can be used to determine the filling level/monitor the filling level.

A preferred development of the device according to the invention proposes that provided in the control/evaluation unit is a program for driving the sensor, via which program the sensor is switched into the at least two different operating modes alternatingly or in accordance with a prescribed switching scheme. It is provided, in particular, that the control/evaluation unit carries out a plausibility check with the aid of the filling level values which are determined using at least two different measurement methods.

Moreover, in accordance with an advantageous embodiment of the device according to the invention the sensor is driven in such a way that the measured data determined using the at least two measurement methods are measured or provided simultaneously or virtually simultaneously.

BRIEF DESCRIPTION OF THE DRAWINGS

The present invention is explained in more detail with the aid of the following drawing of FIG. 1, which shows a schematic of the device 1 according to the present invention.

DETAILED DESCRIPTION

Figure 1:
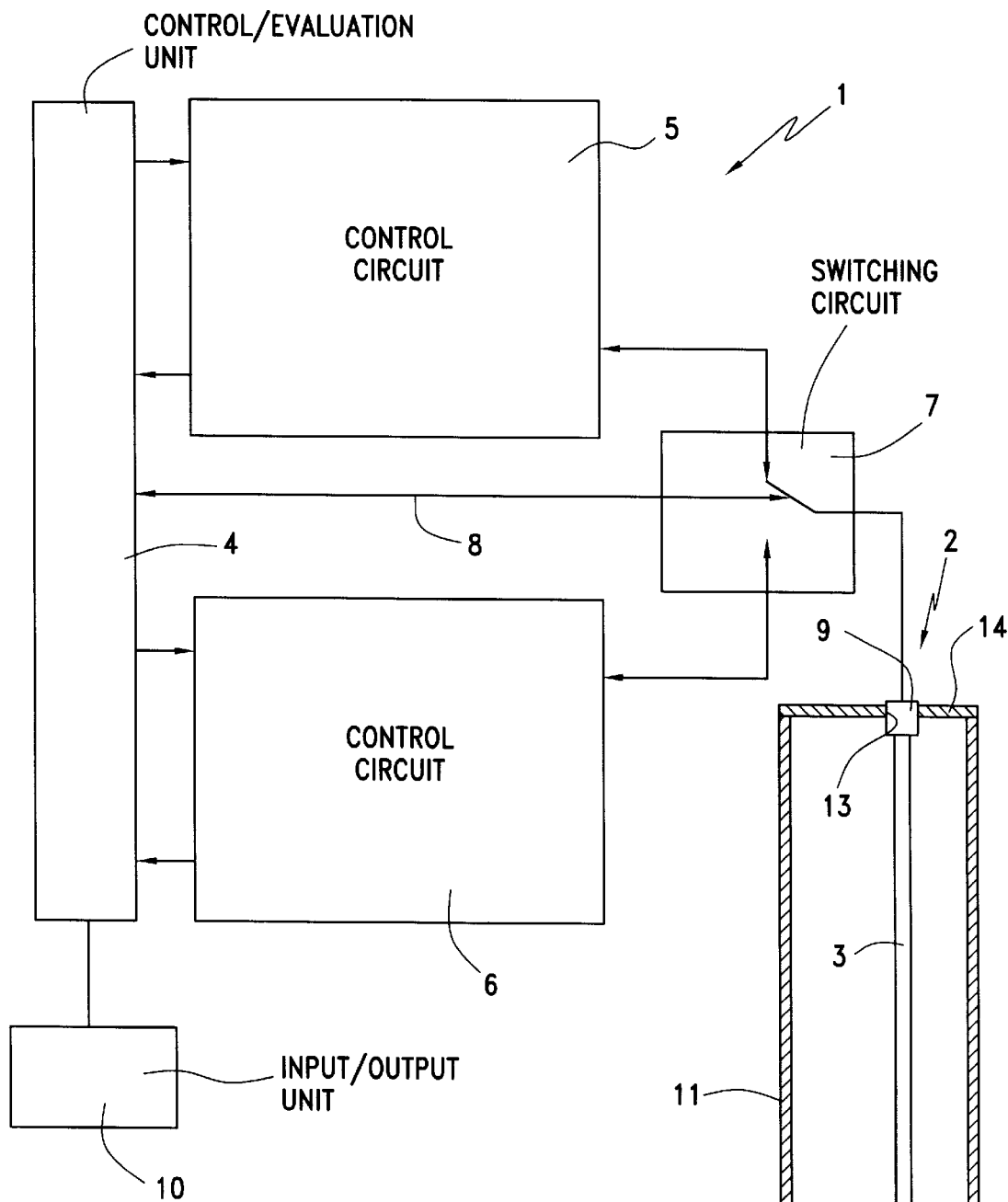

A filing material 12 is located in a container 11. This filling material 12 is either a liquid or a solid. Extending into the container 11 is a sensor 3, which is fastened in an opening 13, for example in a stub, in the lid 14 of the container 11. The conductive element 3 is an essential part of a sensor 2. The conductive element 3 is designed either as a cable or as a rod. The conductive element 3 preferably extends over the entire height of the container 11.

The sensor 2 is fashioned in such a way that, alternately or in parallel, it both delivers filling level measured values which are obtained via a capacitance measurement, and provides filling level measured values which are determined by measuring the run time of radio-frequency measuring signals. If the sensor 3 is operating in the operating mode of "run-time method", the radio-frequency measuring signals are guided along the conductive element 3 into the container 11 and out of the container 11.

In the case of the exemplary embodiment illustrated in FIG. 1, of the device 1 according to the invention, the filling level measured values are optionally provided by one of the two possible measurement methods. The alternating drive is performed via a control/evaluation unit 4 and a switching unit 7. In the case illustrated, it is precisely a control circuit 5 for the capacitive sensor which is connected to the sensor 2 via the switching unit 7, that is to say the filling level measured values are obtained via a capacitance measurement. Upon expiration of a prescribed time, a control circuit 6 for the sensor 2 with the guided measuring signals is connected to the sensor 2 via the switching unit 7, for example in a fashion controlled by the control/evaluation unit 4. The filling level of the filling material 12 in the container 11 is now determined by measuring the run time of the guided radio-frequency measuring signals.

If the two measurement methods are used alternately or else simultaneously, a plausibility check can be carried out. If the deviation between the two measured values falls outside a prescribed tolerance range, it is possible, for example, to use the input/output unit 10 to output an appropriate message to the operating staff. An alarm can be activated in addition.

It is provided, moreover, to use the two measuring systems such that one compensates for the weakness of the respective other system. Thus, for example, it is possible to carry out the calibration of the capacitive measuring system by means of the measuring system having guided measuring signals. It is provided, furthermore, that filling level values which occur in the region of the block distance of the measuring system having guided measuring signals are determined using the capacitive measuring system.

Of course, it is also possible to use the sensor 2 as a universal sensor, as it were. Since the two measurement methods—capacitive measurement method and a measurement method using the determination of run time for guided radio-frequency measuring signals—complement one another outstandingly, one or other of the measurement methods will deliver better measurement results, depending on the application. Thus, for example, the sensor 2 can be operated by exclusive use of one of the two possible measurement methods in an entirely specific fashion as a function of the filling material 12 respectively to be measured. The desired functioning of the sensor 2 can be set by the operating staff via the input/output unit 10.

What is claimed is:

1. A device for measuring the level of a filling material in a container, comprising: a sensor; and a control/evaluation unit, wherein said sensor is designed such that it is operated in conjunction with at least a run-time measurement method and a capacitive measurement method, and/or said sensor is operated in at least two different operating modes, a mode where it works according to a run-time measurement method and a mode where it works according to a capacitive measurement method, wherein said controvevaluation unit operates said sensor respectively according to at least one of the two measurement methods and/or at least in one of the two operating modes, and wherein said control/evaluation unit determines the level of the filling material in the container with the aid of the data measured by said sensor, which are supplied via at least one measurement method and/or during at least one operating mode.

2. The device as claimed in claim 1, wherein the sensor has at least one conductive element which extends into the container.

3. The device as claimed in claim 2, wherein said at least one conductive element comprises at least one of: at least one rod and at least one cable.

4. The device as claimed in claim 2 or 3, wherein said at least one conductive element is optionally used for one of a capacitive measurement method and for a run-time method, said at least one conductive element forming an electrode in the case of the capacitive measurement method, and wherein radio-frequency measuring signals being guided along said at least one conductive element in the case of the run-time method.

5. The device as claimed in claim 3, further comprising: a switching unit via which said sensor can be switched from one operating mode into the other.

6. The device as claimed in claim 5, wherein said switching unit is an electronic switch, preferably a MOSFET transistor.

7. The device as claimed in claim 1, further comprising: an input unit via which the respectively desired operating mode of said sensor is input.

8. The device as claimed in claim 1, wherein said control/evaluation unit is provided with a program for driving said sensor, via which program said sensor is switched into the at least two different operating modes continuously, alternatingly or in accordance with a prescribed switching scheme.

9. The device as claimed in claim 8, wherein said control/evaluation unit carries out a plausibility check with the aid of the filing level values which are determined using at least two different measurement methods.

10. The device as claimed in claim 1, wherein said control/evaluation unit drives said sensor in such a way that the measured data determined using the at least two measurement methods are measured simultaneously or virtually simultaneously.

* * * * *